United States Patent
Salloum Salazar

(10) Patent No.: US 7,616,709 B2
(45) Date of Patent: Nov. 10, 2009

(54) DIFFERENTIAL DECODER FOLLOWED BY NON-LINEAR COMPENSATOR

(75) Inventor: Antonio Elias Salloum Salazar, Eindhoven (NL)

(73) Assignee: Koninklijke Philips Electronics N. V., Eindhoven (NL)

(*) Notice: Subject to any disclaimer, the term of this patent is extended or adjusted under 35 U.S.C. 154(b) by 687 days.

(21) Appl. No.: 10/523,428

(22) PCT Filed: Jul. 24, 2003

(86) PCT No.: PCT/IB03/03329

§ 371 (c)(1), (2), (4) Date: Jan. 28, 2005

(87) PCT Pub. No.: WO2004/015947

PCT Pub. Date: Feb. 19, 2004

(65) Prior Publication Data

US 2006/0013339 A1    Jan. 19, 2006

(30) Foreign Application Priority Data

Aug. 2, 2002 (EP) .................... 02078230

(51) Int. Cl.
H03D 3/22 (2006.01)
(52) U.S. Cl. .................. 375/329; 375/340
(58) Field of Classification Search ................. 375/329, 375/340, 341, 219
See application file for complete search history.

(56) References Cited

U.S. PATENT DOCUMENTS

| | | | | |
|---|---|---|---|---|
| 5,712,870 A | * | 1/1998 | Petrick | 375/147 |
| 5,878,085 A | * | 3/1999 | McCallister et al. | 375/280 |
| 6,055,281 A | * | 4/2000 | Hendrickson et al. | 375/329 |
| 6,578,162 B1 | * | 6/2003 | Yung | 714/708 |
| 6,771,720 B1 | * | 8/2004 | Yang et al. | 375/345 |
| 6,853,695 B1 | * | 2/2005 | Betts et al. | 375/371 |
| 6,977,977 B1 | * | 12/2005 | Dubrovin et al. | 375/346 |
| 2001/0017849 A1 | * | 8/2001 | Campanella et al. | 370/326 |

FOREIGN PATENT DOCUMENTS

WO    WO 9949586    9/1999

OTHER PUBLICATIONS

Robert Schober et al; "Improving Differential Detection of MDPSK by Nonlinear Noise Prediction and Sequence Estimation", IEEE Transactions on Communications, vol. 47, No. 8, Aug. 1999, pp. 1161-1172.

Robert Schober et al; "Adaptive Nonchoerent DFE for MDPSK Signals Transmitted Over ISI Channels", IEEE Transactions on Commmunications, vol. 48, No. 7, Jul. 2000, pp. 1128-1140.

Cheol-Hee Park et al; "Channel Estimation and DC-Offset Compensation Schemes for Frequency-Hopped Bluetooth Networks", IEEE Communications Letters, vol. 5, No. 1, Jan. 2001, pp. 4-6.

* cited by examiner

Primary Examiner—Emmanuel Bayard

(57) ABSTRACT

A receiver including a (differential-quadrature-) phase-shift-keying demodulator (4) and a differential detector (10) having a decoder (19), is provided with a non-linear compensator (20) for compensating the decoder output siqnal for (part of) an interference term, to improve the decoding process and to reduce the number of incorrect decisions. The non-linear compensator (20) includes a channel estimator (22) for estimating a coefficient of a term of the decoder output siqnal and removers (21,23) for removing the term from the decoder output signal.

13 Claims, 1 Drawing Sheet

DIFFERENTIAL DECODER FOLLOWED BY NON-LINEAR COMPENSATOR

Figure 1:
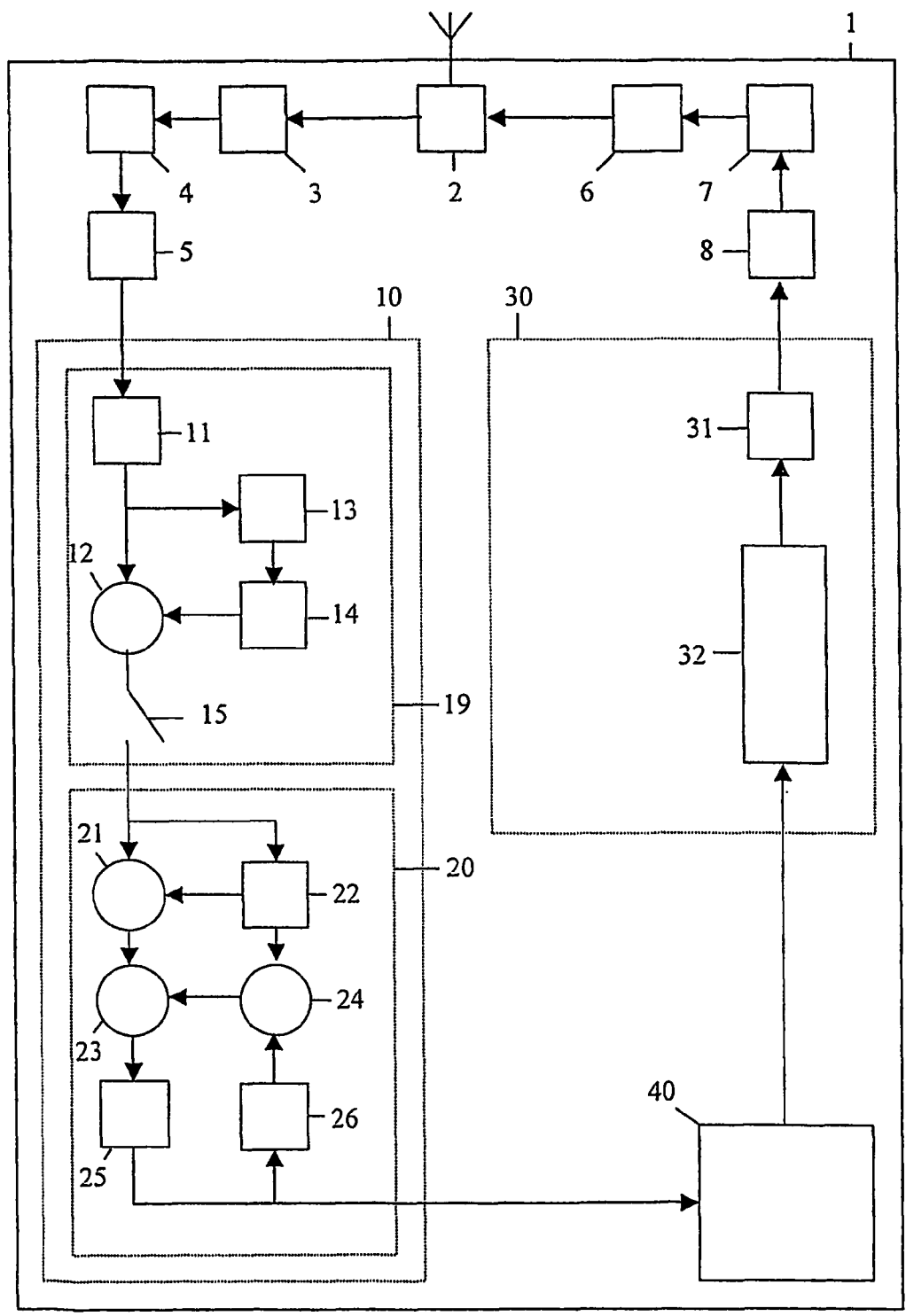

This application is a 371 of PCT/IB03/03329 Jul.24, 2003

The invention relates to a receiver for receiving modulated coded signals and comprising a phase-shift-keying demodulator for demodulating said signals and comprising a differential detector for decoding said signals.

The invention also relates to a non-linear compensator for use in a receiver for receiving modulated coded signals and comprising a phase-shift-keying demodulator for demodulating said signals and comprising a differential detector for decoding said signals, and to a transceiver comprising a transmitter with a differential coder and a phase-shift-keying modulator for transmitting modulated coded signals and comprising a receiver for receiving said modulated coded signals with a phase-shift-keying demodulator for demodulating said signals and a differential detector for decoding said signals, and to a method for receiving modulated coded signals and comprising the steps of demodulating said signals via phase-shift-keying demodulation and of decoding said signals, and to a computer program product stored on a computer-readable medium that, when executed by a processor, configures the processor for receiving modulated coded signals and comprising the functions of demodulating said signals via phase-shift-keying demodulation and of decoding said signals.

Such a receiver forms for example part of a transceiver used in consumer products for wireless communication at short distance, like for example one or ten meters. Said phase-shift-keying demodulator for example corresponds with a differential-quadrature-phase-shift-keying demodulator comprising a $\pi/4$-differential-quadrature-phase-shift-keying demodulator (II/4-DQPSK demodulator).

A prior art receiver is known from U.S. Pat. No. 6,127,884, which discloses in its FIG. 1 a transceiver with a receiver part for receiving modulated coded signals comprising a differential-quadrature-phase-shift-keying demodulator consisting of two mixers and a phase shifter for demodulating said signals and comprising a differential detector for decoding said signals. Said transceiver further comprises a transmitter part comprising an encoder and a modulator for transmitting said modulated coded signals.

The known receiver is disadvantageous, inter alia, in that said decoding process may comprise incorrect decisions as a result of a decoder output signal comprising interference terms.

It is an object of the invention, inter alia, of providing a receiver as defined in the preamble in which receiver said decoding process is improved.

The receiver according to the invention is characterized in that said differential detector comprises a non-linear compensator coupled to a decoder for compensating a decoder output signal.

Said non-linear compensator for compensating the decoder output signal will for example at least partly compensate for (parts of) interference terms present in said decoder output signal. As a result, said decoding process will comprise less incorrect decisions.

The invention is based upon an insight, inter alia, that said decoder output signal may comprise interference terms resulting in incorrect decisions, and is based upon a basic idea, inter alia, that (parts of) these interference terms can at least partly be compensated.

The invention solves the problem, inter alia, of providing a receiver with an improved decoding process, and is advantageous, inter alia, in that said decoding process will comprise less incorrect decisions.

A first embodiment of the receiver according to the invention as defined in claim 2 is advantageous in that said non-linear compensator comprises a channel estimator for estimating at least one coefficient of at least one term of said decoder output signal and a remover for removing at least one term of said decoder output signal.

Said channel estimator estimates coefficients of one or more interference terms and possibly of one or more non-interference terms of said decoder output signal and the remover removes at least one interference term of said decoder output signal.

A second embodiment of the receiver according to the invention as defined in claim 3 is advantageous in that said receiver is designed for a Bluetooth environment.

Said receiver comprising said II/4-DQPSK demodulator and said decoder and said non-linear compensator will, compared to the known Gaussian Frequency Shift Keying (G-FSK) technology in the 2.45 GHz band at 1 Mbit/s, allow transmission at least at twice this bit rate (like for example 2 Mbit/s).

A third embodiment of the receiver according to the invention as defined in claim 4 is advantageous in that said decoder output signal is defined as $u_k = Ab_k + Bb_{k-1} + Cb_{k+1} + Db_k^* + Eb_{k-1}b_k + Fb_kb_{k+1} + Gb_{k-1}b_kb_{k+1} + H$, with said remover removing the H-term.

Said removal of said H-term will reduce the complexity of extracting $b_k$ from $u_k$. The H-term as one and only term not being combined with $b_{k-1}$ and/or $b_k$ and/or $b_{k+1}$ can be removed advantageously. More generally, $u_k = f(b_{k-1}, b_k, b_{k+1}) + H$, with H being removed/compensated.

A fourth embodiment of the receiver according to the invention as defined in claim 5 is advantageous in that said remover comprises a combiner for receiving an H-coefficient from said channel estimator for combining said decoder output signal with said H-term such that said H-term is removed.

Said combiner either receives a positive (read: original) H-coefficient and subtracts this positive H-coefficient from said decoder output signal, or receives a negative (read: inverted) H-coefficient and adds this negative H-coefficient to said decoder output signal.

A fifth embodiment of the receiver according to the invention as defined in claim 6 is advantageous in that said decoder output signal is defined as $u_k = Ab_k + Bb_{k-1} + Cb_{k+1} + Db_k^* + Eb_{k-1}b_k + Fb_kb_{k+1} + Gb_{k-1}b_kb_{k+1} + H$, with said remover removing the $Bb_{k-1}$-term.

Said removal of said $Bb_{k-1}$-term will reduce the complexity of extracting $b_k$ from $u_k$. More generally, $u_k = f(b_{k-1}, b_k, b_{k+1}) + H$, with said $Bb_{k-1}$-term being removed/compensated.

A sixth embodiment of the receiver according to the invention as defined in claim 7 is advantageous in that said remover comprises a combiner for receiving a product of a B-coefficient originating from said channel estimator and a $b_{k-1}$-signal originating from an output of said non-linear compensator and delayed by $T_s$ for combining said decoder output signal with said $Bb_{k-1}$-term such that said $Bb_{k-1}$-term is removed.

Said combiner either receives a positive (read: original) product and subtracts this positive product from said decoder output signal, or receives a negative (read: inverted) product and adds this negative product to said decoder output signal.

A seventh embodiment of the receiver according to the invention as defined in claim 8 is advantageous in that said remover comprises a slicer located between said combiner and said output of said non-linear compensator for slicing the compensated decoder output signal.

Said slicer will further compensate said decoder output signal such that the possible values of the decoder output signal can be better distinguished from each other. In case of differential-quadrature-phase-shift-keying demodulation, the number of possible values is equal to four. In case of differential-phase-shift-keying demodulation, the number of possible values is equal to two. In case of eight-differential-phase-shift-keying demodulation, the number of possible values is equal to eight etc.

It should be noted that due to said combiners for subtracting/adding and due to multipliers for multiplying and generating said products all operating in the complex domain, each complex combining (subtraction/addition) will comprise two real combinings and each complex multiplication will comprise four real multiplications and three real combinings.

Embodiments of the non-linear compensator according to the invention, of the transceiver according to the invention, of the method according to the invention and of the processor program product according to the invention correspond with the embodiments of the receiver according to the invention.

These and other aspects of the invention will be apparent from and elucidated with reference to the embodiments(s) described hereinafter.

FIG. 1 illustrates in block diagram form a receiver according to the invention comprising a non-linear compensator according to the invention.

FIG. 1 discloses a transceiver 1 comprising an antenna interface 2 coupled to an antenna and having an output coupled to an input of a receiving interface 3 (like for example a filter, a pre-amplifier etc.), of which an output is coupled to an input of a ($\pi/4$-)differential-quadrature-phase-shift-keying demodulator 4 or ($\Pi/4$-)DQPSK demodulator 4, of which an output is coupled to an input of a further receiving interface 5 (like for example a further filter, a further amplifier, a converter etc.), of which an output is coupled to an input of a differential detector 10. Receiving interface 3, ($\Pi/4$-)DQPSK demodulator 4, further receiving interface 5, and differential detector 10 together form (a part of) a receiver.

Antenna interface 2 has an input coupled to an output of a transmitting interface 6 (like for example a filter, an amplifier etc.), of which an input is coupled to an output of a ($\Pi/4$-)differential-quadrature-phase-shift-keying modulator 7 or ($\pi/4$-)DQPSK modulator 7, of which an input is coupled to an output of a further transmitting interface 8 (like for example a further filter, a further amplifier, a converter etc.), of which an input is coupled to an output of a differential coder 30. Transmitting interface 6, ($\Pi/4$-)DQPSK modulator 7, further transmitting interface 8, and differential coder 30 together form (a part of) a transmitter.

Differential detector 10 comprises an input interface 11 (like for example a filter etc.) of which an input is coupled to the input of differential detector 10 and of which an output is coupled to a first input of a first multiplier 12 and to an input of a first delaying block 13. An output of first delaying block 13 is coupled to an input of a conjugating block 14, of which an output is coupled to a second input of first multiplier 12, of which an output is coupled to an input of a sampler 15. An output of sampler 15 is coupled to an input of a non-linear compensator 20. Input interface 11, first multiplier 12, first delaying block 13, conjugating block 14, and sampler 15 together form (a part of) a decoder 19.

Non-linear compensator 20 comprises a first combiner 21 of which a first input is coupled to said input of said non-linear compensator 20, and comprises a channel estimator 22 of which an input is coupled to said input of said non-linear compensator 20. A first output of channel estimator 22 is coupled to a second input of first combiner 21, and a second output of channel estimator 22 is coupled to a first input of a second multiplier 24. An output of first combiner 21 is coupled to a first input of a second combiner 23, of which a second input is coupled to an output of second multiplier 24. An output of second combiner 25 is coupled to an input of a slicer 25, of which an output is coupled to an input of a second delaying block 26, of which an output is coupled to a second input of second multiplier 24. First combiner 21 and second combiner 22 together form (a part of) a remover.

The output of slicer 25 forms the output of non-linear compensator 20 and of differential detector 10 and is coupled to an input of a data processor 40, of which an output is coupled to an input of differential coder 30, which comprises an encoder 32 of which an input forms said input of said differential coder 30 and of which an output is coupled to an input of an output interface 31 (like for example a filter etc.), of which an output forms the output of differential coder 30.

Transceiver 1 comprising the receiver 3,4,5,10 according to the invention and the non-linear compensator 20 according to the invention functions as follows. Signals originating from another transmitter of another transceiver and coded by another differential coder and modulated by another differential-quadrature-phase-shift-keying modulator all not shown arrive via the antenna at the antenna interface 2 and flow via receiving interface 3 to demodulator 4 for being demodulated. After demodulation, the demodulated but still coded signals flow via further receiving interface 5 to differential detector 10, in which these coded signals are decoded via decoder 19 and then compensated via non-linear compensator 20.

Decoder 19 decodes the coded signals by interfacing said coded signals via input interface 11 and then multiplying the interfaced coded signals via first multiplier 12 with the complex conjugated interfaced coded signals via conjugating block 14 and delayed by a time-interval $T_s$ (for example corresponding with a symbol period) via first delaying block 13. Finally, the multiplication result signal is sampled via sampler 15 to get a decoder output signal.

This decoder output signal is for example defined as $u_k = Ab_k + Bb_{k-1} + Cb_{k+1} + Db_k^* + Eb_{k-1}b_k + Fb_kb_{k+1} + Gb_{k-1}b_kb_{k+1} + H$, with $b_{k-1}$ being the $b_k$-signal delayed by one time-interval $T_s$ and with $b_k^*$ being the complex conjugated of the $b_k$-signal, and with $Ab_k$ being a non-interference term with A being a non-interference coefficient, and with all other terms being interference terms with B-H being interference coefficients etc. Said decoder output signal is supplied to first combiner 21 and to channel estimator 22, which estimates the H-coefficient and supplies it to first combiner 21 which adds it (in case of the H-coefficient being supplied invertedly) to or subtracts it (in case of the H-coefficient being supplied non-invertedly) from said decoder output signal. As a result, the H-term is removed.

Said removal of said H-term will reduce the complexity of extracting $b_k$ from $u_k$. The H-term as one and only term not being combined with $b_{k-1}$ and/or $b_k$ and/or $b_{k+1}$ can be removed advantageously. More generally, $u_k = f(b_{k-1}, b_k, b_{k+1}) + H$, with H being removed/compensated.

Channel estimator 22 further estimates the B-coefficient and supplies it to second multiplier 24 which multiplies it with the $b_{k-1}$-signal originating from second delaying block 26 (with $b_{k-1}$ being the $b_k$-signal delayed by one time-interval $T_s$ by second delaying block 26) and adds it (in case of the B-coefficient being supplied invertedly) to or subtracts it (in case of the B-coefficient being supplied non-invertedly) from said decoder output signal from which the H-term has already been removed. As a result, the entire $Bb_{k-1}$-term is removed also.

Said removal of said $Bb_{k-1}$-term will reduce the complexity of extracting $b_k$ from $u_k$. More generally, $u_k=f(b_{k-1},b_k,b_{k+1})+H$, with the $Bb_{k-1}$-term being removed/compensated.

Slicer 25 will slice the compensated decoder output signal, which may be considered to be a further compensation of said decoder output signal such that the possible values of the decoder output signal can be better distinguished from each other.

The compensated decoder output signals at the output of non-linear compensator 20 are supplied to data processor 40 (thereto for example comprising a symbol-to-bit-converter) for example for making decisions with respect to the received symbols for example via a threshold detector or an equivalent unit and for example for further data processing purposes.

Signals for example defined as $b_n$-signals originating from data processor 40 (thereto for example comprising a bit-to-symbol-converter) and to be transmitted to another receiver of another transceiver both not shown are coded by encoder 32 of differential coder 30 and for example defined as $c_n=c_{n-1}b_n$ and flow via output interface 31 and further transmitting interface 8 to modulator 7 for being modulated. After modulation, the modulated coded signals flow via transmitting interface 6 and the antenna interface 2 to said antenna for being transmitted etc.

The invention is based upon an insight, inter alia, that said decoder output signal may comprise interference terms resulting in incorrect decisions, and is based upon a basic idea, inter alia, that (parts of) these interference terms can at least partly be compensated.

The invention solves the problem, inter alia, of providing a receiver with an improved decoding process, and is advantageous, inter alia, in that said decoding process will comprise less incorrect decisions.

Said receiver comprising said Π/4-DQPSK demodulator and said decoder and said non-linear compensator will, compared to the known Gaussian Frequency Shift Keying (G-FSK) technology in the 2.45 GHz band at 1 Mbit/s, allow transmission at least at twice this bit rate (like for example 2 Mbit/s).

It should be noted that due to said combiners for subtracting/adding and due to multipliers for multiplying and generating said products all operating in the complex domain, each complex combining (subtraction/addition) will comprise two real combinings and each complex multiplication will comprise four real multiplications and three real combinings.

Said channel estimator is of common general knowledge and is for example based upon the usage of a proprietary training sequence periodically sent from transmitter to receiver and known beforehand at said receiver. Said demodulator, modulator, interfaces, multipliers, combiners, delaying blocks, conjugating block, sampler, slicer and encoder are themselves of common general knowledge. Said transceiver for example forms part of radios for laptop cards, mobile phones, printers, handheld devices, digital cameras, headsets, ISDN access points, in-car subsystems, industrial applications and/or audio/video related equipment.

Especially (parts of) decoder 19 and/or non-linear compensator 20 could be integrated well with data processor 40. Especially in decoder 19 and/or non-linear compensator 20, each block could be 100% hardware, 100% software or a mixture of both.

The benefits of using the non-linear compensator shall be more evident when higher bit rates like 4 Mbits or 10 Mbit/s are pursued. Under these circumstances, the estimate of said A-H can be used to provide more complex compensations and improve the transceiver operation further.

In general, a packet preamble is used to support channel estimation at the receiver. The preamble comprises a certain number of bits, converted into modulated symbols, known beforehand at the receiver.

Let $<x_{k-M}>=1/N \cdot SUM$ (from i=0 to i=N−1) of $x_{i-M}$ be the average function over the first N samples at given generic delay M.

Seven average terms are introduced (these seven average terms are to be calculated in said channel estimator):

$\mu_1=<u_k>$
$\mu_2=<b_k u_k>$
$\mu_3=<b_{k-1} u_k>$
$\mu_4=<b_{k+1} u_k>$
$\mu_5=<b_k b_{k-1} u_k>$
$\mu_6=<b_k b_{k+1} u_k>$
$\mu_7=<b_{k-1} b_k b_{k+1} u_k>$

Then taking into account the known preamble sequence and the structure of $u_k$, the coefficients A-H can be expressed as follows:

$A=f_1(\mu)$
$B=f_2(\mu)$
$C=f_3(\mu)$
$D=G^*$
$E=f_4(\mu)$
$F=f_5(\mu)$
$G=f_6(\mu)$
$H=f_7(\mu)$ with $f_1$ to $f_7$ being derived functions from the known preamble sequence properties and the structure of $u_k$ and $\mu\{\mu_1, \mu_2, \mu_3, \mu_4, \mu_5, \mu_6, \mu_7\}$.

The invention claimed is:

1. A receiver for receiving modulated coded signals, said receiver comprising:
   a phase-shift-keying demodulator for demodulating said signals; and
   a differential detector having a decoder for decoding said signals,
   wherein said differential detector further comprises a non-linear compensator coupled to an output of said decoder for compensating a decoder output signal,
   wherein said non-linear compensator comprises a channel estimator for estimating at least one coefficient of at least one term of said decoder output signal, and a remover for removing said at least one term from said decoder output signal.

2. The receiver according to claim 1, wherein said receiver is designed for a Bluetooth environment.

3. The receiver according to claim 2, wherein said decoder output signal is defined as $u_k=Ab_k+Bb_{k-1}+Cb_{k+1}+Db_k^*+Eb_{k-1}b_k+Fb_kb_{k+1}+Gb_{k-1}b_kb_{k+1}+H$, and said remover removes the H-term from the decoded output signal.

4. The receiver according to claim 3, wherein said remover comprises a combiner for receiving an H-coefficient from said channel estimator for combining said decoder output signal with said H-coefficient such that the H-term in the decoder output signal is removed.

5. The receiver according to claim 2, wherein said decoder output signal is defined as $u_k=Ab_k+Bb_{k-1}+Cb_{k+1}+Db_k^*+Eb_{k-1}b_k+Fb_kb_{k+1}+Gb_{k-1}b_kb_{k+1}+H$, and said remover removes the H-term from the decoded output signal.

6. The receiver according to claim 5, wherein said remover comprises a combiner for receiving a product of a B-coefficient originating from said channel estimator and a $b_{k-1}$-signal originating from an output of said non-linear compensator and delayed by Ts for combining said decoder output signal with said product such that said $Bb_{k-1}$-term is removed from the decoder output signal.

7. The receiver according to claim 6, wherein said remover comprises a slicer located between said combiner and said output of said non-linear compensator for slicing the compensated decoder output signal.

8. A non-linear compensator for use in a receiver for receiving modulated coded signals and comprising a phase-shift-keying demodulator for demodulating said signals, and a differential detector having a decoder for decoding said signals, wherein said differential detector comprises said non-linear compensator coupled to an output of said decoder for compensating a decoder output signal, wherein said non-linear compensator comprises a channel estimator for estimating at least one coefficient of at least one term of said decoder output signal and a remover for removing said at least one term from said decoder output signal.

9. A transceiver comprising a transmitter with a differential coder and a phase-shift-keying modulator for transmitting modulated coded signals, and a receiver for receiving modulated coded signals, said receiver comprising a phase-shift-keying demodulator for demodulating said signals, and a differential detector having a decoder for decoding said signals, wherein said differential detector comprises a non-linear compensator coupled to an output of said decoder for compensating a decoder output signal, wherein said non-linear compensator comprises a channel estimator for estimating at least one coefficient of at least one term of said decoder output signal and a remover for removing said at least one term from said decoder output signal.

10. A method for receiving modulated coded signals comprising the steps of:
receiving modulated coded signals;
demodulating said signals via phase-shift-keying demodulation;
decoding said signals; and
non-linearly compensating the decoded signals, wherein said non-linearly compensating step includes the sub-steps of:
estimating at least one coefficient of at least one term of the decoded signal; and
removing at least one term from the decoded signal corresponding to the estimated at least one coefficient.

11. A computer program stored on a computer readable medium that when executed by a processor configures the processor for receiving modulated coded signals, demodulating said signals via phase-shift-keying demodulation, decoding said signals, and non-linearly compensating decoded signals, wherein said non-linearly compensating function includes the sub-functions:
estimating at least one coefficient of at least one term of the decoded signal; and
removing at least one term from the decoded signal corresponding to the estimated at least one coefficient.

12. Presented) Receiver for receiving modulated coded signals and comprising a phase-shift-keying demodulator for demodulating said signals and comprising a differential detector for decoding said signals, wherein said differential detector comprises a non-linear compensator coupled to a decoder for compensating a decoder output signal, wherein said decoder output signal is defined as $u_k = Ab_k + Bb_{k-1} + Cb_{k+1} + Db_k^* + Eb_{k-1}b_k + Fb_k b_{k+1} + Gb_{k-1}b_{k+1} + H$, with said remover removing the H-term.

13. Receiver for receiving modulated coded signals and comprising a phase-shift-keying demodulator for demodulating said signals and comprising a differential detector for decoding said signals, wherein said differential detector comprises a non-linear compensator coupled to a decoder for compensating a decoder output signal, wherein said decoder output signal is defined as $u_k = Ab_k + Bb_{k-1} + Cb_{k+1} + Db_k^* + Eb_{k-1}b_k + Fb_k b_{k+1} + Gb_{k-1}b_{k+1} + H$, with said remover removing the $Bb_{k-1}$-term.

* * * * *